Patented Aug. 7, 1951

2,563,235

UNITED STATES PATENT OFFICE 2,563,235

PURIFICATION OF 7-DEHYDROSTEROL COMPOUNDS

David H. Gould, New York, N. Y., and William L. Ruigh, Summit, N. J., assignors to Nopco Chemical Company, Harrison, N. J., a corporation of New Jersey No Drawing. Application April 14, 1948, Serial No. 21,098

21 Claims. (Cl. 260—397.2)

This invention relates to the purification of 7-dehydrosterol compounds and, more particularly, to an improved process for separating 7-dehydrosterol compounds from other closely related compounds.

It is well known in the art that 7-dehydrosterols may readily be prepared by halogenating sterol esters with N-halogenated acid amides or imides, subsequently dehydrohalogenating the halogenated sterol esters, and hydrolyzing the dehydrohalogenated sterol esters to obtain the desired 7 - dehydrosterols. British Patent No. 574,432 sets forth in detail such a process, and French Patent No. 901,551 also discloses such a process.

The 7-dehydrosterols obtained by the prior art have, for the most part, been rather impure mixtures of the desired 7-dehydrosterols and other compounds very closely related both chemically and physically. Since the impurities in the crude mixtures have physical and chemical characteristics which are similar to those of the desired 7-dehydrosterols, it is quite difficult to recover pure 7-dehydrosterols from the impure mixtures. As yet no practical and simplified means has been devised for obtaining 7-dehydrosterols in pure form from such reaction mixtures.

It is the object of this invention to provide a means for obtaining pure 7-dehydrosterols.

A further object of this invention is to provide an improved process for separating 7-dehydrosterols from other closely related compounds so as to obtain the 7-dehydrosterols in a pure form.

Another object of the invention is to provide a means for obtaining pure 7-dehydrosterol esters.

Other objects of the invention will in part be obvious and will in part appear hereinafter.

We have discovered that the above and other objects of the invention may be accomplished by carrying out the dehydrohalogenation of a halogenated sterol ester at a relatively low temperature, i. e. not above about 135° C., and preferably at about 90–100° C., thereafter subjecting either the crude dehydrohalogenated sterol ester or the crude free 7-dehydrosterol obtained therefrom to treatment with an organic acid, and then recovering the pure 7-dehydrosterol compound from the treated mass by any suitable means, e. g. crystallization, adduct or complex formation with organic acids, digitonide precipitation, chromatographic separation, etc.

We have found that when 7-dehydrosterol compounds are produced by a process wherein the dehydrohalogenation of a halogenated sterol ester is carried out at relatively low temperatures, as set forth above, a large part of the impurities which are obtained along with the desired 7-dehydrosterol compounds, although they have chemical and physical properties very close to those of the desired 7-dehydrosterol compounds, are transformed by mild treatment with organic acids to compounds having physical and chemical characteristics so widely different from those of the 7-dehydrosterol compounds that the 7-dehydrosterol compounds, which are not affected by the mild acid treatment, may readily be separated therefrom by any of the methods set forth above or similar methods. If the dehydrohalogenation of halogenated sterol esters is carried out at relatively high temperatures, e. g. 170–240° C., such as has often been employed in the prior art, a very large part of the impurities which are produced along with the desired 7-dehydrosterol compounds are not transformed by mild treatment with acids to compounds having chemical and physical characteristics considerably different from those of the desired 7-dehydrosterol compounds such as occurs with the bulk of the impurities produced during the low temperature dehydrohalogenation when the latter impurities are subjected to a mild acid treatment. Thus by carrying out the dehydrohalogenation at relatively low temperatures and subjecting the crude 7-dehydrosterol compound obtained to a mild acid treatment, it is then possible to obtain from the crude material a 7-dehydrosterol compound having a very high degree of purity.

Although a crude 7-dehydrosterol compound which has been obtained by a process wherein a halogenated sterol ester is dehydrohalogenated at relatively high temperatures may be purified to some extent by the process of our invention, neither the degree of purification nor the final purity of such a 7-dehydrosterol compound will be nearly so great as that of a 7-dehydrosterol compound produced by a process wherein the dehydrohalogenation is carried out at relatively low temperatures as set forth above.

Although we prefer to employ the process of our invention in purifying crude free 7-dehydrosterols, we have found that the mild acid treatment may, if desired, advantageously be carried out on the crude 7-dehydrosterol esters obtained by the relatively low temperature dehydrohalogenation process instead of first hydrolyzing the crude 7-dehydrosterol esters to the crude free sterols and then subjecting the crude free sterols to the acid treatment. When a crude 7-dehydrosterol ester which has been obtained by a relatively low temperature dehydrohalogenation is treated with an organic acid in accordance with the process of our invention, a large part of the impurities contained therein will be converted into materials having chemical and physical characteristics much different from the characteristics of the 7-dehydrosterol ester; and thus such an acid-treated crude 7-dehydrosterol ester may readily be converted to a product of much higher purity inasmuch as the 7-dehydrosterol ester may readily be separated from impurities in the acid-treated crude material by conventional means such as fractional crystallization, chromatographical separation, etc. Also, the acid-treated crude 7-dehydrosterol ester may, if desired, be hydrolyzed after the acid treatment to the crude free sterol, and thereafter the free 7-dehydrosterol separated from the impurities in the crude material in the same manner as when the acid treatment is carried out directly upon the crude free sterol. As a matter of convenience, however, we prefer to hydrolyze the crude 7-dehydrosterol esters to the corresponding crude free sterols before carrying out the organic acid treatment of the process of our invention, and the process of the invention will be described hereinafter with particular reference to its applicability to the purification of the crude free 7-dehydrosterols. It is to be definitely understood, however, that the process for purifying the crude free 7-dehydrosterols is likewise applicable as far as the essential steps of the process are concerned to the purification of the crude 7-dehydrosterol esters.

We have not definitely ascertained the composition of all of the impurities produced under the varying conditions of dehydrohalogenation of the halogenated sterol esters. With both the high temperature and the low temperature dehydrohalogenation there appears to be produced varying amounts of triene compounds. Since these compounds are hydrocarbons they have physical and chemical characteristics considerably different from the characteristics of the 7-dehydrosterols and the 7-dehydrosterol esters and therefore may be separated therefrom by conventional methods without too much difficulty. With the high temperature dehydrohalogenation, however, the greater part of the impurities appear to be esters of a class of dienols which we shall call dienol A's. Since 7-dehydrosterols are themselves dienols it is not at all surprising that the physical and chemical characteristics of the dienol A's are essentially the same as those of the 7-dehydrosterols, and that it is very difficult indeed to separate the two types of compounds. As pointed out hereinabove the dienol A's or the esters thereof are not affected by the acid treatment of the process of our invention. On the other hand the principal impurities produced by the low temperature dehydrohalogenation instead of being esters of dienol A's as is the case with the high temperature dehydrohalogenation are esters of a class of dienols which we shall call dienol B's. Occasionally very small amounts of esters of dienol A's are also produced by the low temperature dehydrohalogenation. The dienol B's have physical and chemical characteristics which are in many ways similar to those of the dienol A's and of the 7-dehydrosterols. This is not at all surprising, of course, since probably the only difference between a dienol A, a dienol B, and a 7-dehydrosterol which have all been produced from the same type of sterol is in the location of the two double bonds in the sterol nucleus. The very important difference, however, between the dienol B's and the other dienols is that on treatment with a suitable acid, the dienol B's and esters thereof are readily transformed to compounds of a triene hydrocarbon nature which have physical and chemical characteristics which are far different from the physical and chemical characteristics of the 7-dehydrosterols and dienol A's and of esters thereof. These new compounds which are formed by the acid treatment may therefore be readily separated from both the 7-dehydrosterols and their esters and from any dienol A's and their esters which may be associated therewith by any of the well-known methods set forth above or other suitable methods.

As yet we have not definitely determined the composition of the compounds which are formed from the dienol B's and esters thereof by the acid treatment, but from the available data which we have, it seems fairly certain that they are triene compounds. Such a transformation is directly contra to what would be expected in view of the reports in the prior art concerning acid treatments of dienols. Schenck et al., in Berichte 69, 2696 (1936) have definitely shown that 7-dehydrocholesterol, which is a dienol, may be converted to Δ7,14 cholestadienol (dehydrocholesterol B₃) by rather vigorous treatment with hydrochloric acid. Thus the only effect of their vigorous acid treatment of the 7-dehydrochloesterol was to shift the conjugated double bonds to new positions. Since such was the only result of the acid treatment of 7-dehydrocholesterol which is a dienol, the logical assumption would be that the only effect of acid treatments of other dienols would be to give similar changes in view of the very close similarity of the various dienols in their physical and chemical characteristics. Further support for such a conclusion is found in the work on ergosterol by Heilbron and Spring, J. Chem. Soc., 2807 (1929). As is well known, ergosterol is very similar to 7-dehydrocholesterol and has a conjugated double bond system located in the sterol nucleus in the same position as the conjugated double bond system in 7-dehydrocholesterol. Heilbron and Spring working with ergosterol acetate demonstrated that by employing a rather drastic acid treatment with either HCl or $H_2SO_4$, they could cause one of the double bonds in the sterol nucleus to shift to a new position thus producing a new isomeric form of the sterol ester. The HCl treatment gave them two such isomers while the $H_2SO_4$ gave them only one of the two isomers produced by the HCl treatment. From their work the logical conclusion would seem to be that the only effect of any acid treatment of a sterol compound containing two double bonds in the sterol nucleus would be to cause a shift in the position of the double bonds. However, as we have already pointed out, acid treatment of the dienol B's and esters thereof does not merely produce a rearrangement of the double bonds as would be expected from the disclosures in the prior art thus giving a new dienol, but instead it produces compounds entirely different from the dienols both in their physical characteristics and in their chemical characteristics. Such a result was entirely unexpected and could not have been predicted from the previously known behavior of similar sterol compounds.

Thus by carrying out the dehydrohalogenation of a halogenated sterol compound at a relatively low temperature and thereafter subjecting the crude 7-dehydrosterol or an ester thereof so obtained to a mild acid treatment, a crude 7-dehydrosterol or an ester thereof is obtained containing impurities the major portion of which have physical and chemical characteristics so different from the characteristics of the 7-dehydrosterol compounds that the 7-dehydrosterol compound may be separated from the impurities by conventional methods such as set forth above and recovered in pure form.

The process of our invention is applicable to the preparation of pure 7-dehydrosterols from a large number of sterols. Among such sterols there may be mentioned cholesterol, $\beta$-sitosterol, epicholesterol, campesterol, 22,23 dihydrobrassicasterol, etc.

In most instances it is preferred to employ sterol esters as the original starting materials which are to be halogenated in the first step of the process for preparing the 7-dehydrosterols. As far as the process of our invention is concerned, the acyl radicals of sterol esters which are so employed as starting materials may be derived from either aliphatic or aromatic acids. Thus sterol esters such as sterol acetates, propionates, butyrates, benzoates, dinitrobenzoates, etc. may all be employed.

Because of the present demand for large quantities of 7-dehydrocholesterol to be used in making vitamin $D_3$, the process of our invention is particularly valuable as a means for producing pure 7-dehydrocholesterol. Since the production of pure 7-dehydrocholesterol is probably the most valuable use for our process and as a matter of convenience in describing our invention, the detailed description given hereinafter will refer specifically to the production of pure 7-dehydrocholesterol. It is to be understood, however, that the process of our invention may be employed equally as well for the production of pure 7-dehydrosterols from any of the other sterols listed or similar sterols as well as from cholesterol, and that our invention is not limited merely to the production of pure 7-dehydrocholesterol.

Since we are describing the process of our invention with particular reference to the production of pure 7-dehydrocholesterol, it might be well to set forth here the physical and chemical characteristics of the dienol A, dienol B, and triene which may be produced during the production and purification of 7-dehydrocholesterol.

The cholestadienol A obtainable from cholesterol has the following spectrographic characteristics:

$$E_{1\,cm.}^{1\%}$$

is about 430 at 2500 Å. in isopropanol with an inflection at 2450 Å. It has a melting point in $CO_2$ of about 99° C. The rotation is $[\alpha]_D^{23.5°} = -37.6°$ (in chloroform). It is precipitated with digitonin, but it does not readily react with maleic anhydride.

The cholestadienol B obtainable from cholesterol has the following spectrographic characteristics:

$$E_{1\,cm.}^{1\%}$$

628 at 2400 Å. with minor peaks at 2325 Å. and 2475 Å. in isopropanol. Cholestadienol B has a melting point in $CO_2$ of about 119° C. In chloroform its optical rotation is $[\alpha]_D^{23.5°} = -32.3°$. It is digitonin precipitable, gives a negative Tortelli-Jaffe test, and gives a positive Rosenheim test.

The cholestatriene which is obtainable from cholesterol through acid treatment of cholestadienol B has the following spectrographic characteristics:

$$E_{1\,cm.}^{1\%}$$

362 at 3060 Å. with inflections at 2930 Å. and 3200 Å. and minimum at 2500 Å. in isopropanol. It has a melting point of about 70° C. In chloroform its rotation is $[\alpha]_D^{23.5°} = -18.9°$.

The first important step in our process for producing pure 7-dehydrocholesterol is the dehydrohalogenation of the halogenated cholesterol esters. It is very important to carry out the dehydrohalogenation step in such a manner that the majority of the impurities which are produced by secondary reactions during the dehydrohalogenation are such that on treatment with an acid in accordance with the second step of the process of our invention they will be transformed into materials having physical and chemical characteristics far different from the characteristics of 7-dehydrocholesterol and thus be readily separable therefrom by conventional means. In order to obtain a crude 7-dehydrocholesterol wherein the impurities contained therein are of such a type, we have found that the dehydrohalogenation step must be carried out at relatively low temperatures. In the prior art it usually has been considered that the most favorable temperature at which to carry out the dehydrohalogenation step was the reflux temperature of the particular dehydrohalogenating agent being employed. Since the most common dehydrohalogenating agents are dimethylaniline, diethylaniline, quinoline and collidine, it is obvious that the dehydrohalogenation temperatures most frequently employed in the prior art have ranged from about 172° C. to about 240° C. However, as pointed out above, we have found that in order to obtain 7-dehydrocholesterol having associated therewith impurities a large percentage of which on treatment with an acid will be transformed into compounds having physical and chemical characteristics far different from those of 7-dehydrocholesterol, it is necessary to carry out the dehydrohalogenation reaction at a somewhat lower temperature than has most usually been employed in the prior art. We have found that in order to obtain the desired crude 7-dehydrocholesterol which can be most effectively treated by the acid purification step of the process of our invention, it is necessary to carry out the dehydrohalogenation at a temperature not above about 135° C. and preferably at a temperature of about 90° C. to 100° C. When carrying out the dehydrohalogenation at the preferred temperature range of from about 90° C. to about 100° C., a reaction time of from about two to about three hours is preferably employed. If temperatures slightly higher than the preferred range are employed, the heating period may be decreased somewhat with periods of about one hour being sufficient at the highest temperatures. However, it is much preferred to heat the reaction mixture at the preferred lower temperatures for a longer period of time since higher reaction temperatures favor the formation of cholestadienol A which is not affected by the acid treatment step of our invention. Any of the known dehydrohalogenating agents, such as, for example, those set forth above, may be employed in the dehydrohalogenation step of the process of our invention. The ratio of dehydrohalogenating agent to sterol esters is not particularly important except, of course, that there should be sufficient dehydrohalogenating agent present to react with all of the halogenated cholesterol ester which is present, i. e., at least an equimolecular ratio of dehydrohalogenating agent to halogenated sterol ester should be employed, and preferably from two to three moles of dehydrohalogenating agent per mole of halogenated sterol ester is used.

Following the dehydrohalogenation step of the process of our invention, the crude 7-dehydrocholesterol esters are hydrolyzed with alkali to crude 7-dehydrocholesterol before the acid treatment step of our process is carried out, although if desired the acid treatment step of the process may be carried out directly upon the crude 7-dehydrocholesterol esters. Details of such hydrolysis reactions and methods for recovery of the crude sterol are given in the British and French patents referred to hereinabove and need not be set forth here. We prefer, however, to employ the improved method of hydroysis disclosed and claimed in the copending application of Kurt H. Schaaf, Serial No. 781,497, filed October 22, 1947, now Patent No. 2,542,291.

In carrying out the acid treatment step of the process of our invention any of a rather large number of organic acids may be employed. Among the organic acids which may be employed in the process of our invention there may be mentioned formic acid, acetic acid, propionic acid, butyric acid, valeric acid, caproic acid, caprylic acid, oxalic acid, malonic acid, succinic acid, glutaric acid, adipic acid, acrylic acid, crotonic acid, vinylacetic acid, maleic acid, fumaric acid, dichloroacetic acid, chloroacetic acid, bromoacetic acid, glycolic acid, lactic acid, malic acid, tartaric acid, citric acid, benzoic acid, phthalic acid, etc. Of the many acids which may be used in the process of our invention, we highly prefer to employ acetic acid as the acid treating agent. Buffer salts may be used with the organic acids if desired. Among the many buffer salts which may be used in the process of our invention there may be mentioned the formates, acetates, benzoates, etc. of sodium and potassium, and any of the other commonly used buffer salts.

It will be noted that the organic acids listed above all have ionization constants which are within the range of from about $5 \times 10^{-2}$ to about $1 \times 10^{-5}$. Generally speaking organic acids which have ionization constants falling within that range may suitably be employed in the process of our invention. Mixtures of the various acids may be employed, if desired, and likewise when a buffer salt is utilized suitable mixtures of such salts may be employed instead of using a single salt.

When the mild acid treatment step of the process of our invention is carried out, cholestadienol B is transformed into a compound having physical and chemical characteristics far different from those of 7-dehydrocholesterol. The 7-dehydrocholesterol, however, is unaffected by such acid treatment although it has been shown in the prior art that under somewhat more severe conditions, acid treatment of 7-dehydrocholesterol can cause a rearrangement of the double bond system in the sterol nucleus thus forming a different dienol.

In carrying out the process of our invention, the crude 7-dehydrocholesterol is treated with an organic acid in the presence of a solvent. In some cases the acid being employed may also serve as the solvent; and when we use the term "solvent" in the specification and in the claims in connection with the acid treatment, it is to be understood that the term covers the use not only of a solvent other than the acid being employed, but also it covers the use of the acid itself as the solvent as well as the agent for transforming the dienol B whenever the acid employed is adaptable to such two-fold use. Among the acids which may be utilized both as the solvent medium and as the treating agent there may be mentioned acetic acid, formic acid, propionic acid, valeric acid, etc. In fact any of the acids given hereinabove or similar acids which in their natural state are liquids and which under such conditions have an ionization constant within or somewhat close to the desired range as set forth hereinabove, may be employed not only as the acid treating agent but also as the solvent medium in which to carry out the acid treatment. If desired, the acids may be diluted with water or with some other suitable solvent. Thus, for example, when acetic acid is used as the acid treating agent and also as the solvent, it can be diluted with about 5% of water without any decrease in effectiveness. As long as the solvent being employed still dissolves the crude 7-dehydrocholesterol and remains miscible with or still dissolves the acid being used and any buffer salts which may be employed, it may be admixed or diluted with another solvent such as water even though such other solvent by itself would not be miscible with one or more of the reactants. Thus, although water itself is not miscible with the crude 7-dehydrocholesterol, when only 5% of water is added to acetic acid, the resulting solvent completely dissolves the crude 7-dehydrocholesterol at the temperatures employed in the treatment. When a solvent other than one of the treating acids is employed, it will be necessary to employ one which not only dissolves the 7-dehydrocholesterol and any buffer salts that are employed, but also the acid which is being employed. The choice of solvent is usually not too important as long as it meets those qualifications since the only purpose of the solvent is to allow for a more efficient interaction between the acid and the crude 7-dehydrocholesterol. Consequently, the choice of solvent will depend somewhat upon the solubility of the acid being employed and the solubility of the buffer salts, if any, which are being utilized. Occasionally, as will be more fully pointed out hereinafter, certain solvents do not appear to be as suitable as other solvents when relatively strong acids are employed. When the acid which is being used is a solid under ordinary conditions, it is usually preferred to carry out the acid treatment in some solvent which itself is not an acid.

In addition to the liquid acids which may be used as solvents as well as acid treating agents, solvents such as hydrocarbon solvents, halogenated hydrocarbon solvents, nitro hydrocarbon solvents, low molecular weight ethers, low molecular weight ketones, low molecular weight alcohols and low molecular weight esters, etc. may suitably be employed as solvents in which to carry out the acid treatment step of our process. Preferably such solvents which are employed should have a boiling point below about 150° C. As examples of such solvents which may suitably be used there may be mentioned solvents such as petroleum ether, pentane, hexane, heptane, octane, benzene, cyclohexane, carbon tetrachloride, chloroform, methylene chloride, ethylene dichloride, trichlorethylene, nitroethane, ethyl ether, acetone, methyl ethyl ketone, ethyl acetate, methyl acetate, isopropyl acetate, butyl acetate, methyl alcohol, ethyl alcohol, isopropyl alcohol, and similar solvents. Also solvents such as dioxane may be employed. Suitable mixtures of such solvents may also be employed if desired.

In carrying out the acid treatment step of the process of the invention, the ratio of solvent to crude 7-dehydrocholesterol may vary considerably although in all cases it is preferred to employ sufficient solvent to dissolve the crude material completely at the temperature of the treatment. A large excess of solvent over that amount may be used if desired, but too large an excess of solvent will usually result only in unnecessarily lengthening the process of recovering the pure 7-dehydrocholesterol from the acid treatment mixture. Also, of course, if an acid is being employed which is normally solid, then an amount of solvent which is sufficient to dissolve the acid completely as well as dissolve the crude material being treated should be employed.

When one is using a solvent other than the acid being employed as the acid treating agent, the ratio of the solvent to the acid may vary considerably. Such ratio will depend to some extent upon the strength of the particular acid which is being employed, upon the temperature at which the treatment is carried out, and upon the length of time that the reaction mixture is kept at an elevated temperature when the acid treatment is carried out at temperatures above room temperature. As has previously been pointed out, organic acids which have ionization constants between about $5 \times 10^{-2}$ and about $1 \times 10^{-5}$ may suitably be employed in the process of the invention. Since there is quite a bit of difference, of course, between the strength of the acids which have ionization constants at the upper limit and those which have ionization constants at the lower limit of such range, it is only logical that when the stronger acids are employed the reaction conditions need not be nearly as severe as when the weaker acids are employed. Thus when one of the stronger acids is employed in the process, the solvent solution of the organic acid need not contain as high a percentage of the acid as when one of the weaker acids is employed in order to obtain the same results, all other reaction conditions in each case being substantially the same of course. In fact when the stronger acids are employed it is highly preferable to employ solvent solutions of the acids which have a fairly high ratio of solvent to organic acid so as to lessen any likelihood of the 7-dehydrocholesterol being adversely affected by the acid treatment. As has been previously pointed out, workers in the prior art have found that vigorous treatment of 7-dehydrocholesterol with mineral acids will convert the 7-dehydrocholesterol to other compounds. We have found that 7-dehydrocholesterol may also be deleteriously affected by too vigorous treatment with strong organic acids; and, therefore, as a general rule it is preferred to employ somewhat milder reaction conditions when one of the stronger acids is being used as compared to the conditions employed when one of the weaker acids is being used in the process. Thus, for example, when acetic acid, which is a relatively weak acid, is the acid-treating agent, the crude 7-dehydrocholesterol may be dissolved directly in the concentrated acid, i. e. in glacial acetic acid, and the acid solution of the crude material heated at temperatures as high as 95° C. for an hour or more without causing any noticeable destruction of the 7-dehydrocholesterol; however, such a reaction mixture need not be heated nearly that long since the desired conversion of cholestadienol B to cholestatriene is accomplished in from 15 to 30 minutes under such reaction conditions. When strong organic acids such as oxalic acid are employed, the acids preferably should be dissolved in non-acid organic solvents using a rather high ratio of solvent to acid; and then when the crude 7-dehydrocholesterol is treated with the solvent solution of the acid, the mixture should not be heated for too long a period of time or at too high a temperature. In such a case if the miture is heated at a relatively high temperature, e. g. 90° to 95° C., the length of time of heating should be fairly short; however, if the mixture is heated to a temperature only slightly above room temperature, e. g. about 35° C., then the length of time of heating will be somewhat longer. Thus when oxalic acid is employed as the acid-treating agent, excellent results may be obtained with solvent solutions of the acid which do not contain more than about 1% of acid; and even with such dilute solutions, it is usually not necessary to heat the acid treatment mixture for more than a few minutes, e. g. not more than about ten or fifteen minutes, to obtain complete conversion of dienol B to materials which may readily be separated from the 7-dehydrocholesterol, and when the reaction mixture is heated it need not be heated to as high a temperature as is usually employed with the weaker acids. In most cases, however, it is preferred to heat the reaction mixture to at least 50° C. in carrying out the acid treatment. When one of the weaker acids is being used, a relatively dilute solvent (non-acid solvent) solution of the acid may be satisfactorily utilized as long as the length of time the acid treatment mixture is heated is extended slightly longer than when a more concentrated solution of the acid is employed. Thus, for example, if acetic acid is used as the acid treating agent, instead of using the concentrated acid as both the solvent medium and the acid treating agent one may obtain very good results with solvent (non-acid solvent) solutions of the acetic acid containing from about 20% to 25% of acetic acid provided the acid treatment mixture is heated at about 95° C. for from forty-five minutes to an hour. A further variable which sometimes must be considered is the particular solvent which is being used. Apparently in some of the solvents which may be employed in the acid treatment step of our invention, some of the organic acids are more effective than in various of the other solvents which may be used. Thus, for example, we have found that when oxalic acid is dissolved in ethylene dichloride and the resultant acid solution employed in the process of the invention, the amount and length of time of heating should be less than when an isopropyl acetate solution of oxalic acid having the same concentration of acid is employed if it is desired to obtain the same results in both cases. When oxalic acid solutions in ethylene dichloride are used, prolonged heating may lead to some destruction of 7-dehydrocholesterol.

It is thus quite evident that no hard and fast rules can be laid down as to the concentration of acid in the solvent solutions of organic acids to be employed or as to the length of time of heating the reaction mixture or the temperatures to which the reaction mixture should be heated, if heated at all, which would cover all of the various organic acids which may successfully be employed in the practice of our invention. As a general rule, however, it can be stated that the stronger the acid which is employed the milder should be the conditions which are employed, and the weaker the acid which is being used the more drastic the reaction conditions may be. In every case the particular reaction conditions necessary to give the optimum results with a particular acid should be determined by carrying out a few small scale experiments prior to using such acid for purifying large quantities of crude material. However, once the most useful ratios of the particular acid and solvent being employed and the most efficient reaction conditions for the use of such solvent solution of that particular acid are determined, such a solvent solution of the acid and such reaction conditions may then be used thereafter in all cases for purifying a crude 7-dehydrosterol material produced by a relatively low temperature dehydrohalogenation process. If then in future purifications it is desired to modify one or more of the conditions of the reaction or the quantities of the reactants, it should be remembered that if one such factor is altered in such a manner as will make the treatment of the crude material less drastic, then another factor should be made more severe and vice versa if the over-all effect of the acid treatment of the crude material is to remain the same as before.

As previously pointed out we have discovered that mild acid treatment of crude 7-dehydrocholesterol and its esters does not have any adverse effects on the 7-dehydrocholesterol or its esters, but such mild acid treatment does convert dienol B and its esters into materials which have chemical and physical properties so widely different from the properties of 7-dehydrocholesterol and its esters that such an acid treated crude material may readily be further treated by conventional methods to isolate pure or relatively pure 7-dehydrocholesterol or its esters as the case may be from the treated mass. As was known in the prior art, 7-dehydrocholesterol is susceptible to destruction if treated too rigorously with an acid and consequently when the acid treatment step of our invention is carried out, if too rigorous conditions are employed when relatively strong acids are being used there is a possibility of some destruction of 7-dehydrocholesterol occurring. While it is not possible to set up any fixed rules which will apply to all of the acids which may suitably be used in the process of our invention, i. e. with regard to the concentrations of the acids in the various solvents which can be employed, the temperatures to which the reaction mixture may be heated, the length of time of heating, etc., all of the organic acids which have ionization constants within the range given hereinabove or very near thereto may be successfully used in the process of our invention if the general rules and suggestions which we have set forth above as to their use are followed. As previously mentioned, in order to determine the optimum conditions when any particular acid is used with any particular solvent, it may be necessary to carry out a few preliminary experiments following the general rules for carrying out the acid treatment which we have set forth above. With regard to the temperature to which the acid treatment mixture may be heated, it might be well to repeat that with the weaker acids the mixture may be and preferably is heated to 95°–100° C. or more for anywhere from a few minutes to half an hour or an hour or more whereas with the stronger acids it is necessary to heat the reaction mixture only a slight amount if at all, and if it is heated it need be heated for only a short time, e. g. ten or fifteen minutes. In determining the optimum conditions for treatment in each individual case we have followed the course of the reaction by taking the ultraviolet absorption spectra of the crude material and of the products obtained at varying time intervals of treatment. The characteristics of the absorption curves of the individual compounds have already been given and the interpretation of the spectrographic results is a relatively simple procedure.

After the acid treatment step of the process of our invention, the pure 7-dehydrocholesterol may easily be recovered from the reaction mass by any one of a number of conventional methods. Thus crystallization, adduct formation, digitonide precipitation, chromatographic separation, liquid-liquid distribution, esterification followed by saponification, etc., are all suitable methods for recovering the pure 7-dehydrocholesterol from the acid treatment mixture. The method preferably used will depend to some extent upon the particular acid which is employed in the acid treatment step. Ordinarily, the recovery of the pure 7-dehydrocholesterol may most readily and economically be carried out by a conventional crystallization process preferably employing as the medium in which to carry out the crystallization a suitable organic solvent selected from the classes of solvents listed hereinabove as being suitable for use in carrying out the acid treatment step. If the acid treatment is carried out without having any solvent present other than the acid used as the treating agent, a fairly large percentage of an organic non-acid solvent selected from the classes given hereinabove is preferably added to the acidic reaction mixture before carrying out the crystallization separation of the pure 7-dehydrocholesterol from the acid treatment mixture. When recovering the pure 7-dehydrocholesterol from the acid treatment mixture by a crystallization process wherein a non-acid organic solvent is employed, it is preferred to adjust the concentration of non-acid organic solvent in the mixture prior to carrying out the crystallization so that such solvent will comprise from at least 25% of the mixture up to as high as 90% of the mixture if the percentage of such solvent is not already within such range.

In the preferred embodiment of our invention, we dissolve the impure 7-dehydrocholesterol in approximately 95%–100% acetic acid employing sufficient acetic acid to dissolve the crude material completely at about 95° C. Ordinarily it is preferred to employ at least one part of the acetic acid per each part of crude 7-dehydrocholesterol; if desired, larger proportions of the acetic acid may be employed, e. g. five parts or more of acetic acid per each part of crude 7-dehydrocholesterol. The acid is preferably heated to a moderate temperature, e. g. about 95° C. and the crude material then dissolved therein with stirring. Heating is then continued at the same temperature for a short time, e. g. from about fifteen to about thirty minutes, so that the acid will have a better opportunity to act upon the impurities in the crude 7-dehydrocholesterol. Thus in the preferred process of our invention the acid acts not only as the acid treating agent but also as the solvent medium in which to carry out the reaction.

After the acetic acid treatment of the crude 7-dehydrocholesterol, the pure 7-dehydrocholesterol may be recovered from the acid treatment mixture by any of the conventional methods set forth hereinabove or similar methods. We prefer to add a non-acid organic solvent of the type set forth hereinabove, preferably an organic ester having a relatively low boiling point such as isopropyl acetate, to the acid treatment mixture and then cool the solvent solution to a low temperature and remove therefrom by filtration or other suitable means the crystals of pure 7-dehydrocholesterol which separate out at the low temperature. If desired, the acid treatment mixture may be cooled to about 15° C. without admixing any non-acid organic solvent therewith whereupon the 7-dehydrocholesterol will crystallize and may readily be separated from the reaction mixture by any suitable means. However, cooling of the acid solution to only 15° C. does not give as good recovery of the pure 7-dehydrocholesterol as is desirable and since the acetic acid itself would solidify if the solution were cooled much below 15° C., it is much preferred to add an appreciable amount of a non-acid organic solvent of the type set forth hereinabove to the acid solution so that the solution may be cooled to about 0° C. or below. The amount of non-acid organic solvent which is added should preferably be equal to at least one-third of the volume of the acid treatment mixture and may be as much as nine times the volume of the acid treatment mixture if desired. Of the various solvents and types of solvents which may be so employed, we prefer to employ low-boiling organic esters, i. e. esters having a boiling point up to and including about 125° C., such as methyl acetate, ethyl acetate, isopropyl acetate, butyl acetate, etc.

After the 7-dehydrocholesterol is recovered from the acid treatment mixture, it may be recrystallized from one of the non-acid organic solvents or treated in any other suitable manner in order to insure complete separation of the 7-dehydrocholesterol from any impurities still associated therewith, such as cholestatriene, etc.

After recovery of the 7-dehydrocholesterol by the process of our invention, the 7-dehydrocholesterol may be further purified if desired. As has been pointed out hereinabove if any cholestadienol A was originally present with the 7-dehydrocholesterol, it will not be transformed by the acid purification step. Also if any cholesterol was present with the impure 7-dehydrocholesterol, part of it will also be present therewith at the completion of the process of our invention. However, since our process separates the 7-dehydrocholesterol from cholestadienol B, cholestatrienes, and minor impurities except cholestadienol A, if much is present, and cholesterol, any further purification of the 7-dehydrocholesterol which may be required is greatly simplified. As has been pointed out above we have discovered that low temperature dehydrohalogenation methods of producing 7-dehydrocholesterol give products which are relatively free from cholestadienol A although the products do contain a considerable amount of cholestadienol B. Thus when low temperature dehydrohalogenation methods of producing 7-dehydrocholesterol are employed there will be very little if any, problem involved with regard to removal of cholestadienol A from the product. In practically all cases, however, there will be a small amount of the original cholesterol which will remain with the 7-dehydrocholesterol throughout the process of our invention. However, in most cases the 7-dehydrocholesterol obtained by the process of our invention will be in relatively pure form. As will be seen from the specific examples given hereinafter, we are able to obtain by the process of our invention 7-dehydrocholesterol having a purity of 90% or better. Such 7-dehydrocholesterol may be further purified by conventional means such as, for example, fractional crystallization of the sterol itself or esters thereof such as the dinitrobenzoates, chromatographic separation, etc. Also when 7-dehydrochlolesterol has been purified only by the process of our invention, the purified product may be converted to vitamin $D_3$ by ultraviolet light irradiation or other suitable means, and then any further purification which it is desired to make may be carried out upon the vitamin $D_3$ product.

It is well known that sterols such as cholesterol and 7-dehydrocholesterol form adducts with oxalic acid. Thus, if oxalic acid is employed as the acid treating agent in the process of our invention, the 7-dehydrocholesterol and any cholesterol which is associated therewith will usually precipitate from the acid treatment mixture as the oxalic acid adduct particularly if the acid treatment is carried out at a temperature only slightly above room temperature or if the reaction mixture is cooled to about room temperature without adding to the acid treatment mixture any material such as water, an alcohol, an alkali, etc. which would prevent the formation of the adduct or decompose the adduct if it has already been formed. Therefore, if desired, the 7-dehydrocholesterol may be separated from the acid treatment mixture as the oxalic acid adduct when oxalic acid is employed as the acid treating agent; however, we prefer to either prevent the formation of the oxalic acid adduct or to dissociate any such adduct which has formed, e. g. by adding water or an alcohol to the reaction mixture, and then recover the 7-dehydrocholesterol by crystallizing it from the reaction mixture at a low temperature and recovery of it by filtration or centrifugation of the mixture as outlined hereinabove.

If an acid other than oxalic acid has been employed as the acid treating agent, one may employ oxalic acid to recover the pure 7-dehydrocholesterol from the acid treatment product through formation of the oxalic acid adduct of the 7-dehydrocholesterol if so desired.

The process of our invention is particularly directed to the combined steps of first producing a crude 7-dehydrocholesterol or ester thereof in which the major portion of the impurities are such that on treatment with a suitable acid they will be converted to compounds readily separable from the pure 7-dehydrocholesterol or ester thereof, and second an acid treatment of the crude 7-dehydrocholesterol material carried out in such a manner as to effect such transformation of the impurities without destroying the 7-dehydrocholesterol. However, it is to be definitely understood that our invention also covers the step of acid treating any mixture of 7-dehydrocholesterol and cholestadienol B, or a mixture of esters of such materials, no matter how produced since we have discovered that such a mixture may be treated with organic acids without any detrimental effect whatsoever to the 7-dehydrocholesterol while at the same time converting the chloestadienol B to a compound having physical and chemical characteristics far different from those of 7-dehydrocholesterol and thus readily separable therefrom by conventional means.

For a fuller understanding of the nature and objects of the invention, reference may be had to the following examples which are merely illustrative and are not to be construed in a limiting sense.

EXAMPLE I

*Preparation of crude 7-dehydrocholesterol*

The halogenated chloesteryl acetate obtained by reacting 1000 gms. of chloesteryl acetate with 513 gms. of powdered, crystallized 96.9% N-bromosuccinimide was dehydrohalogenated with diethylaniline employing 1.5 liters of anhydrous distilled diethylaniline. The dehydrohalogenation reaction mixture was heated for about three hours at a temperature of about 90° to 95° C. with stirring in vacuo ($N_2$ atm.). The 7-dehydrocholesterol acetate obtained was hydrolyzed by dissolving it in 4125 ml. of ethanol containing 397 gms. of 87% potassium hydroxide, and refluxing the resulting mixture for ½ hr. ($N_2$ atm.). After filtering the hot reaction mixture, it was cooled in ice until crystallization had largely taken place. 600 ml. of water were then slowly added with stirring after which the mixture was chilled at −15° C. overnight. The crude 7-dehydrocholesterol was filtered off at −15° C. and washed with cold (−15° C.) ethanol. Analysis of the dried, crude 7-dehydrocholesterol showed that 53.4% of the crude material was 7-dehydrocholesterol, and 33.3% of the crude material was cholestadienol B. No cholestadienol A was found.

EXAMPLE II

*Preparation of crude 7-dehydrocholesterol*

The halogenated cholesteryl benzoate obtained by reacting 2000 grams of cholesteryl benzoate with 900 gms. of crystallized 97.4% N-bromosuccinimide was dehydrohalogenated with diethylaniline employing 3 liters of anhydrous, distilled diethylaniline. The dehydrohalogenation reaction mixture was heated for about four hours at a temperature of about 90° to 95° C. The 7-dehydrocholesteryl benzoate obtained was hydrolyzed by refluxing it with stirring in six liters of ethanol containing 300 gms. of 87% potassium hydroxide. One liter of the ethanol was distilled off at the beginning of the refluxing and then the mixture was refluxed with stirring for 1½ hours. The precipitated potassium benzoate was filtered off and washed with hot ethanol. The combined filtrate was reheated to dissolve the sterol, and 700 ml. of hot water admixed therewith. The mixture was cooled to −15° C. and stored overnight. It was then filtered in the cold (−15° C.) and washed with 500 ml. of cold methanol, twice with 2.5 liters each of cold water, and finally twice with one liter each time of cold methanol. The crude material was then dried in vacuo at room temperature. Analysis of the crude material showed that 53.2% of it was 7-dehydrocholesterol, and 33% of it was made up of cholestadienol B. No cholestadienol A was found.

EXAMPLE III

Ten grams of crude 7-dehydrocholesterol prepared in the same manner as the products of Examples I and II and containing 56.8% 7-dehydrocholesterol and 32.7% cholestadienol B were dissolved in 10 ml. of 95% acetic acid and the resulting solution heated on a steam bath for one-half hour ($CO_2$ atmosphere). To the hot solution there was added 20 ml. of dried isopropyl acetate and the resulting mixture was stored at room temperature until crystallization began; it was then stored at −15° C. The crystalline 7-dehydrocholesterol was filtered off at −15° C. and washed once with 10 ml. of cold (−15° C.) methanol and then dried in vacuo giving 5.36 grams of a cream colored crystalline solid which on spectographic analysis showed a purity of 86.3% 7-dehydrocholesterol. Thus an 81.4% recovery of 7-dehydrocholesterol was obtained from the original crude sterol.

EXAMPLE IV

Another 10 gram sample of the crude 7-dehydrocholesterol employed in Example III was treated in essentially the same manner as in Example III with the exception that 15 ml. each of 95% acetic acid and dried isopropyl acetate were used. A 79.5% recovery of 7-dehydrocholesterol having a purity of 78.5% was obtained.

EXAMPLE V

Ten grams of a crude 7-dehydrocholesterol prepared in the same manner as the products of Examples I and II and having a purity of 50.85% and containing 35.4% cholestadienol B were dissolved in 20 ml. of 95% acetic acid and the mixture heated on a steam bath for one-half hour ($CO_2$ atmosphere). Twenty ml. of hot dried isopropyl acetate were then admixed therewith and the mixture stored at room temperature for crystallization and then at −15° C. The purified 7-dehydrocholesterol was recovered as in the previous examples with a yield of 75% which was found to have a purity of 70%.

EXAMPLE VI

Five grams of the crude 7-dehydrocholesterol of Example I having a purity of 53.4% and containing 33.3% cholestadienol B were dissolved in a mixture of 10 ml. of glacial acetic acid and 10 ml. of dried isopropyl acetate. The mixture was heated on a steam bath ($N_2$ atmosphere) for one-half hour. The solution was stored at room temperature until crystallization began and then at −15° C. overnight. The crystals were filtered off at −15° C., washed with cold (−15° C.) isopropyl acetate and then dried, giving 2.71 grams of a yellowish-white crystalline solid. The product contained 74.5% 7-dehydrocholesterol. Thus a recovery of 75.6% of the original 7-dehydrocholesterol was obtained.

EXAMPLE VII

Ten grams of the crude 7-dehydrocholesterol employed in Example VI were dissolved in a mixture of 22.5 ml. of glacial acetic acid and 7.5 ml. of dried isopropyl acetate. The resulting mixture was treated as in Example VI and a purified product containing 70.5% 7-dehydrocholesterol was obtained with a recovery of 85.2% of the original 7-dehydrocholesterol. A sample of 6.13 grams of the purified product was then recrystallized from 15.3 ml. of dried isopropyl acetate giving a product having a purity of 92.6% with a recovery of 7-dehydrocholesterol of 90.3%.

EXAMPLE VIII

Five grams of the crude 7-dehydrocholesterol employed in Example VI were dissolved in 25 ml. of hot glacial acetic acid and heated on a steam bath for fifteen minutes ($N_2$ atmosphere). The solution was then stored at room temperature until crystallization occurred and was then cooled to 15° C. and filtered. The crystals were washed twice with ice-cold methanol and dried in the vacuum desiccator giving 2.64 grams of cream colored crystalline solid having a purity of 73.7%. Thus the 7-dehydrocholesterol was recovered in a yield of 72.9%.

EXAMPLE IX

Ten grams of a crude 7-dehydrocholesterol prepared in the same manner as the products of Examples I and II and having a purity of 50.85% and containing 35.4% cholestadienol B were dissolved in 30 ml. of 95% acetic acid and heated on a steam bath for ½ hr. ($CO_2$ atmosphere). The solution was stored at room temperature until crystallization occurred and then at 2° C. overnight. The crystals were filtered off at room temperature and washed once with 10 ml. of ice-cold methanol giving 6.76 grams of the purified product. The purified material contained 63.15% 7-dehydrocholesterol thus giving a recovery of the 7-dehydrocholesterol of 84.0%.

EXAMPLE X

Ten grams of the crude sterol employed in Example IX were treated in the same manner as in Example IX with the exception that 90% acetic acid was employed in place of 95% acetic acid. The product contained 63.8% 7-dehydrocholesterol and the yield of the recovered 7-dehydrocholesterol was 84.4%.

EXAMPLE XI

Ten grams of the crude 7-dehydrocholesterol of Example I having a purity of 53.4% and containing 33.3% cholestadienol B were dissolved in 30 ml. of propionic acid and the mixture was heated on a steam bath for one-half hour ($CO_2$ atmosphere). The mixture was stored at room temperature until crystallization occurred, and it was then cooled to —15° C.; the crystalline material was filtered off, washed with cold (—15° C.) methanol and dried giving 6.93 gms. of a crystalline solid having a purity of 64.25%. Thus the 7-dehydrocholesterol was recovered in over 83% yield. A sample of 6.75 grams of the purified 7-dehydrocholesterol was recrystallized from 16.9 ml. of dried isopropyl acetate. The recrystallized product contained 90.5% 7-dehydrocholesterol and the recovery in the recrystallization amounted to 82.1%.

EXAMPLE XII

Ten grams of the crude 7-dehydrocholesterol employed in Example XI were treated in essentially the same manner as in Example XI with the exception that 95% propionic acid was employed. Also there was no recrystallization step as in Example XI. The 7-dehydrocholesterol was recovered in an 88% yield and the purified product had a purity of 65.4%.

EXAMPLE XIII

Ten grams of the crude 7-dehydrocholesterol employed in Example XI were dissolved in a mixture of 20 ml. of 95% propionic acid and 20 ml. of dried isopropyl acetate. The mixture was treated in essentially the same manner as in the previous example giving a product containing 63.7% of 7-dehydrocholesterol. The 7-dehydrocholesterol was recovered in an 84.6% yield.

EXAMPLE XIV

Ten grams of a crude 7-dehydrocholesterol prepared in the same manner as the products of Examples I and II and having a purity of 50.85% and containing 35.4% cholestadienol B were dissolved in 20 ml. of 95% propionic acid. The mixture was heated on a steam bath for one-half hour ($CO_2$ atmosphere) and then 20 ml. of hot dried isopropyl acetate were admixed therewith. The mixture was stored at room temperature for crystallization and then at —15° C. The crystallized material was filtered off at —15° C. and washed once with 10 ml. of cold (—15° C.) methanol and then dried. The product was 5.92 grams of a cream colored crystalline solid 70.5% of which was 7-dehydrocholesterol. Thus the 7-dehydrocholesterol was recovered in an 82% yield.

EXAMPLE XV

Fifty grams of a crude 7-dehydrocholesterol having a purity of 56.5% and containing 26.7% cholestadienol B were dissolved in 150 ml. of dried isopropyl acetate by heating the mixture at the reflux temperature of the solvent. The hot solution was filtered and then a boiling hot solution of 11.8 grams of anhydrous oxalic acid in 50 ml. of dry isopropyl acetate was added thereto. The mixture was refluxed ($CO_2$ atmosphere) for about fifteen minutes and then 210 ml. of methanol were added to the hot solution to prevent the formation of the oxalic acid adduct of the 7-dehydrocholesterol and to dissociate any such adduct which may have formed. (Thus the oxalic acid adduct was not isolated.) The resulting solution was further refluxed for ¾ hour. Thereafter 21.75 ml. of hot water was added to the mixture and the mixture heated to boiling to dissolve a small amount of precipitate. The solution was stored at room temperature until crystallization had taken place and was then chilled at —15° C. for 64 hours before filtering. The purified product was filtered at —15° C., washed with cold (—15° C.) methanol and dried in the usual manner giving 39.6 grams of product. This material was recrystallized by dissolving it under reflux ($CO_2$ atmosphere) in 119 ml. of dried isopropyl acetate, filtering the hot solution, storing the solution for crystallization at room temperature, and then chilling it at —15° C. for 64 hours. The purified product was filtered off at —15° C. and washed twice with 20 ml. each of cold (—15° C.) isopropyl acetate. The crystals were dried in vacuo giving 23.66 grams of colorless needles. The final product was 93.5% 7-dehydrocholesterol. Thus 78.4% of the 7-dehydrocholesterol originally present in the crude material was recovered.

EXAMPLE XVI

A sample of 5 grams of a crude 7-dehydrocholesterol containing 13.5% 7-dehydrocholesterol and approximately 46% cholestadienol B was dissolved in 50 ml. of ethylene dichloride by warming the mixture on a steam bath. To the warm solution there was added 1.67 gms. of dichloroacetic acid and the resulting solution was then cooled to 15° C. and allowed to stand for 18 hours. The solution was then washed with 10% $K_2CO_3$ and then with water until neutral. The solution was then dried over $Na_2SO_4$, and the solvent distilled off leaving 4.9 gms. of a yellow solid. Spectroscopic analysis of this material showed that by far the largest part of the cholestadienol B in the crude material had been converted to triene. The acid-treated material was then chromatographed using an activated $Al_2O_3$ column. The material was first dissolved in hexane and the hexane solution poured into the column and the column eluted with additional hexane to give a hexane fraction which yielded almost pure triene. The column was then eluted with benzene and then with a benzene-methanol mixture containing 90% benzene and 10% methanol. Upon evaporating off the benzene and methanol from the benzene-methanol eluate, a product was obtained which when analyzed spectrographically was found to contain 18.4% 7-dehydrocholesterol. Thus this product had a purity 36.3% higher than the purity of the crude material. The total recovery of 7-dehydrocholesterol from the crude material amounted to 81.5%.

EXAMPLE XVII

Ten grams of crude 7-dehydrocholesteryl acetate containing 45.5% of 7-dehydrocholesteryl acetate, 35.2% of cholestadienyl B acetate and 3.56% of triene were dissolved in 20 ml. of glacial acetic acid, and the resulting solution was then heated on a steam bath for about thirty minutes. The acid solution was then dissolved in 150 ml. of ether and the ether solution washed with an aqueous 10% $K_2CO_3$ solution until it was alkaline, and then washed with water until neutral. The neutral solution was dried over $Na_2SO_4$, filtered, and the ether removed by distillation under reduced pressure leaving 10.2 grams of a red-brown semi-crystalline material. Spectroscopic analysis of this material showed that it contained 44.8% 7-dehydrocholesteryl acetate, little or no dienyl B acetate and 30.7% of triene. Thus it is evident that the acetic acid treatment of the crude 7-dehydrocholesteryl acetate converted the dienyl B acetate almost completely to triene. The acid-treated material was saponified with 5 grams of KOH in 60 ml. of methanol and the saponification mixture then dissolved in 500 ml. of ether. The ether solution was washed to neutrality with water, dried over $Na_2SO_4$, filtered, and the ether removed by distillation under reduced pressure. The crude residue was crystallized from a minimum (12 ml.) of dry isopropyl acetate by dissolving the residue in the warm solvent and then cooling the solution to room temperature. The solvent and the crystallized material were then stored at $-15°$ C. overnight, filtered, washed with cold methanol and dried in vacuo. Light tan crystals containing 67.7% 7-dehydrocholesterol, 7.4% triene and a trace of dienol B were obtained. Thus the refined product had a 50% higher purity of 7-dehydrocholesterol as compared to the purity of the crude 7-dehydrocholesteryl acetate.

EXAMPLE XVIII

A crude 7-dehydrocholesterol containing 33.3% dienol B, 4.6% triene, and 53.4% 7-dehydrocholesterol was purified by heating 10.0 grams of the crude 7-dehydrocholesterol with 7.5 grams of monochloroacetic acid in the presence of 22.5 ml. of isopropyl acetate. The mixture was heated at about 95° C. for about fifteen minutes. Upon cooling the isopropyl acetate solution of the treated material to about $-15°$ C., the purified material separated from the solution in the form of crystals. Spectroscopic analysis of the refined material showed that it contained only 5.3% dienol B. Apparently all of the rest of the dienol B had been converted to triene by the acid treatment. An 84.0% recovery of the 7-dehydrocholesterol originally contained in the crude material was obtained. The refined product contained 58.5% of 7-dehydrocholesterol and 9.2% of triene.

Although the process of our invention has been specifically described with particular reference to the production of purified 7-dehydrocholesterol and to the treatment of crude 7-dehydrocholesterol containing cholestadienol B, it is definitely to be understood that the process of our invention is equally applicable to the production of purified 7-dehydrosterols from any of the other sterols or sterol esters set forth hereinabove or other similar sterols and sterol esters in addition to cholesterol and esters thereof, and to the treatment of any crude 7-dehydrosterol which contains a dienol B or to any crude 7-dehydrosterol ester which contains an ester of a dienol B.

Having described our invention, what we claim as new and desire to secure by Letters Patent is:

1. In a process for producing pure 7-dehydrocholesterol, the step comprising contacting a mixture of 7-dehydrocholesterol and cholestadienol B with an organic carboxylic acid.

2. In a process for producing pure 7-dehydrocholesterol, the step comprising contacting a mixture of an ester of 7-dehydrocholesterol and an ester of cholestadienol B with an organic carboxylic acid.

3. In a process for producing pure 7-dehydrocholesterol, the steps comprising dissolving a mixture of 7-dehydrocholesterol and cholestadienol B in a liquid organic carboxylic acid and heating the resulting mixture to a temperature of at least about 35° C.

4. In a process for producing pure 7-dehydrocholesterol, the steps comprising dissolving a mixture of 7-dehydrocholesterol and cholestadienol B in a liquid organic carboxylic acid, heating the resulting mixture to a temperature of at least about 35° C. for a short time, dissolving the acid mixture in a non-acid organic solvent, cooling the resulting mixture to a temperature somewhat below room temperature, and separating from the mixture the purified 7-dehydrocholesterol which crystallizes out at the low temperature.

5. The process of claim 4 wherein the non-acid organic solvent is an organic ester having a relatively low boiling point.

6. In a process for producing pure 7-dehydrocholesterol, the steps comprising dissolving a mixture of 7-dehydrocholesterol and cholestadienol B in acetic acid, heating the resulting mixture to a temperature of about 95° C. for a short time, dissolving the acid mixture in isopropyl acetate, cooling the resulting mixture to a temperature somewhat below room temperature, and separating from the mixture the purified 7-dehydrocholesterol which crystallizes out at the low temperature.

7. The process of claim 6 wherein ethyl acetate is employed in place of isopropyl acetate.

8. In a process for producing pure 7-dehydrocholesterol, the step comprising heating a mixture of 7-dehydrocholesterol, cholestadienol B, an organic carboxylic acid, and a non-acid organic solvent in which the other components of the mixture are all soluble, to a temperature of at least about 35° C. for a short time.

9. In a process for producing pure 7-dehydrocholesterol, the steps comprising heating a mixture of 7-dehydrocholesterol, cholestadienol B, oxalic acid, and a non-acid organic solvent in which the other components of the mixture are all substantially soluble to a temperature of at least about 35° C. for a short time, dissociating any oxalic acid adduct which may have formed, cooling the solution to a temperature somewhat below room temperature and recovering from the mixture the purified 7-dehydrocholesterol which crystallizes out at the low temperature.

10. In a process for producing pure 7-dehydrocholesterol, the steps comprising heating a mixture of 7-dehydrocholesterol, cholestadienol B, oxalic acid, and isopropyl acetate to a temperature of at least about 35° C. for a short time, dissociating any oxalic acid adduct which may have formed, cooling the solution to a temperature somewhat below room temperature and recovering from the mixture the purified 7-dehydrocholesterol which crystallizes out at the low temperature.

11. In a process for producing pure 7-dehydrocholesterol, the steps comprising dehydrohalogenating at a temperature not above about 135° C. a cholesterol ester halogenated at the 7 position, converting the crude 7-dehydrocholesterol ester to the crude 7-dehydrocholesterol, and contacting the crude 7-dehydrocholesterol with an organic carboxylic acid.

12. In a process for producing pure 7-dehydrocholesterol, the steps comprising dehydrohalogenating at a temperature not above about 100° C. an ester of cholesterol halogenated at the 7 position, and then contacting the crude 7-dehydrocholesterol ester thus obtained with an organic carboxylic acid.

13. In a process for producing pure 7-dehydrocholesterol, the steps comprising dehydrohalogenating at a temperature not above about 100° C. an ester of cholesterol halogenated at the 7 position, hydrolyzing the crude 7-dehydrocholesterol ester, and contacting the crude 7-dehydrocholesterol thus obtained with an organic carboxylic acid.

14. In a process for producing pure 7-dehydrocholesterol, the steps comprising dehydrohalogenating at a temperature not above about 100° C. a cholesterol ester halogenated at the 7 position, hydrolyzing the crude 7-dehydrocholesterol ester, dissolving the crude 7-dehydrocholesterol obtained in a liquid organic carboxylic acid and heating the resulting mixture to a temperature of at least 35° C. for a short time.

15. In a process for producing pure 7-dehydrocholesterol, the steps comprising dehydrohalogenating at a temperature not above about 100° C. a cholesterol ester halogenated at the 7 position, hydrolyzing the crude 7-dehydrocholesterol ester, dissolving the crude 7-dehydrocholesterol obtained in a liquid organic carboxylic acid, heating the resulting mixture to a temperature of at least about 35° C. for a short time, dissolving the acid mixture in a non-acid organic solvent, cooling the resulting mixture to a temperature somewhat below room temperature, and separating from the mixture the purified 7-dehydrocholesterol which crystallizes out at the low temperature.

16. The process of claim 15 wherein the non-acid organic solvent is an organic ester having a relatively low boiling point.

17. In a process for producing pure 7-dehydrocholesterol, the steps comprising dehydrohalogenating at a temperature not above about 100° C. a cholesterol ester halogenated at the 7 position, hydrolyzing the crude 7-dehydrocholesterol ester, dissolving the crude 7-dehydrocholesterol obtained in acetic acid, heating the resulting mixture to a temperature of about 95° C. for a short time, dissolving the acid mixture in isopropyl acetate, cooling the resulting mixture to a temperature somewhat below room temperature, and separating from the mixture the purified 7-dehydrocholesterol which crystallizes out at the low temperature.

18. The process of claim 17 wherein ethyl acetate is employed in place of isopropyl acetate.

19. In a process for producing pure 7-dehydrocholesterol, the steps comprising dehydrohalogenating at a temperature not above about 100° C. a cholesterol ester halogenated at the 7 position, hydrolyzing the crude 7-dehydrocholesterol ester, admixing the crude 7-dehydrocholesterol obtained with an organic carboxylic acid and a non-acid organic solvent in which the organic acid and the crude 7-dehydrocholesterol are both soluble, and heating the mixture to a temperature of at least about 35° C. for a short time.

20. In a process for producing pure 7-dehydrocholesterol, the steps comprising dehydrohalogenating at a temperature not above about 100° C. a cholesterol ester halogenated at the 7-position, hydrolyzing the crude 7-dehydrocholesterol ester, admixing the crude 7-dehydrocholesterol obtained with oxalic acid and a non-acid organic solvent in which the oxalic acid and the crude 7-dehydrocholesterol are both soluble, heating the mixture to a temperature of at least about 35° C. for a short time, dissociating any oxalic acid adduct of the 7-dehydrocholesterol which has formed, and separating from the mixture at a temperature somewhat below room temperature the purified 7-dehydrocholesterol which crystallizes from the mixture at a temperature somewhat below room temperature.

21. In a process for producing pure 7-dehydrocholesterol, the steps comprising dehydrohalogenating at a temperature not above about 100° C. a cholesterol ester halogenated at the 7 position, hydrolyzing the crude 7-dehydrocholesterol ester, admixing the crude 7-dehydrocholesterol obtained with oxalic acid and isopropyl acetate, heating the mixture to a temperature of at least about 35° C. for a short time, dissociating any oxalic acid adduct of the 7-dehydrocholesterol which has formed, and separating from the mixture at a temperature somewhat below room temperature the purified 7-dehydrocholesterol which crystallizes from the mixture at a temperature somewhat below room temperature.

DAVID H. GOULD.
WILLIAM L. RUIGH.

No references cited.